(12) United States Patent
Zhu (10) Patent No.: US 7,865,643 B2
(45) Date of Patent: Jan. 4, 2011

(54) COMMUNICATION SYSTEM AND PROTOCOL (75) Inventor: Dao-Yi Zhu, Acton, MA (US)

(73) Assignee: American Power Conversion Corporation, West Kingston, RI (US)

(*) Notice: Subject to any disclaimer, the term of this patent is extended or adjusted under 35 U.S.C. 154(b) by 66 days.

(21) Appl. No.: 12/361,591

(22) Filed: Jan. 29, 2009

(65) Prior Publication Data

US 2010/0191882 A1 Jul. 29, 2010

(51) Int. Cl.
*G06F 13/42* (2006.01)
(52) U.S. Cl. .................. 710/105; 710/305; 715/200
(58) Field of Classification Search .......... 710/105, 710/305–306; 715/735, 200; 709/206
See application file for complete search history.

(56) References Cited

U.S. PATENT DOCUMENTS 5,542,072 A * 7/1996 Kawashima et al. ............ 1/1
6,249,668 B1 6/2001 Abe et al.
6,587,033 B1 7/2003 Morishima

FOREIGN PATENT DOCUMENTS

EP 0498660 A1 12/1992

OTHER PUBLICATIONS

International Search Report and Written Opinion in corresponding Application No. PCT/US2010/022396 dated, Apr. 14, 2010.

* cited by examiner

*Primary Examiner*—Thomas J Cleary
*Assistant Examiner*—Kim T Huynh
(74) *Attorney, Agent, or Firm*—Lando & Anastasi, LLP (57) ABSTRACT

A communication system and protocol that permits a first device to communicate a plurality of messages in a predetermined order to a user of the first device, where the plurality of messages, their content, and their predetermined order need not be known to the first device until the messages are provided to the first device by a second device. The user of the first device is permitted to move backward or forward through the messages in the predetermined order while utilizing a minimal amount of resources of the first device, such as processor power and memory.

25 Claims, 5 Drawing Sheets

COMMUNICATION SYSTEM AND PROTOCOL

FIELD OF THE INVENTION

The invention relates generally to a communication system and protocol, and more particularly, to a communication system and protocol that enables a device to communicate messages to a user of the device, where the content, order, and number of messages need not be known to the device prior to run-time.

BACKGROUND OF THE RELATED ART

In many industries, companies with different areas of expertise may collaborate with one another to develop a new product that combines the talents of each. For example, a company known for their design of uninterruptible power supplies for data centers may collaborate with another company known for their design of media system servers and controllers to provide a power management and protection solution for audio and/or video systems that integrates with the other company's media system servers and controllers. During the design phase of such a collaborative product, specifications reflecting the design, features, capabilities, etc. of the collaborative product are drafted, revised, and then finalized. Once the design is finalized, it becomes difficult to add new features or functionality to the product, or to correct design oversights, without impacting the schedule of the collaborative product.

One area of a collaborative product that is typically specified early on in the design process (and which all too frequently changes or evolves over time) is the user interface. For example, early on in the design process, the collaborating companies will need to agree upon how many buttons, keys, dials, display elements (e.g., display lines, status LEDs, buzzers, etc.) and other user accessible functional elements the collaborative product will have, and what their functionality will be. Thus, for example, if the collaborative product is to have only a single line display, and a single button, the companies will need to agree on what, if any message, is displayed to the user on the display when the product is powered on, what message is displayed to the user when, for example, the user presses the button once, what message is displayed if the button is pressed again, etc.

In a typical product, these messages (i.e., their content, their order, and typically their number) are stored or otherwise reflected in the firmware of the product, which, in a typical product design process, is frozen well in advance of production. This is unfortunate because this code freeze often occurs well prior to final verification testing where errors may be discovered, or where it may be determined that new or different functionality should be provided.

SUMMARY

According to one aspect of the present invention, it is appreciated that there is a need to provide a flexible, efficient, and memory sensitive messaging system and protocol that allows a device to communicate a virtually unlimited number of messages to a user of the device, where the number of messages, their order, and their content need not be known to the device prior to run time. Advantageously, the messaging system and protocol does not require the device that communicates the messages to the user store or access the messages from its own static memory, such as ROM based memory (e.g., ROM, PROM, EEPROM, FLASH, etc.) or require significant amounts of dynamic memory (e.g., RAM) or processing power. Because knowledge of the number of messages, their order, and their content need not be known (i.e., stored in the device) prior to run time, messages may be added, re-ordered, deleted or otherwise changed. Moreover, new functionality may be provided each time the device is powered on.

According to one embodiment of the present invention, a method of communicating a plurality of messages that are arranged in a determined order to a user of a first device is provided. The plurality of messages includes in the determined order a first message, a second message, a next to last message and a last message. The method comprises acts of storing, in the first device, the first message and the last message of the plurality of messages, and communicating a third message to the user of the first device. In response to a direction of a navigational command received from the user of the first device, the method further comprises an act of communicating the first message to the user of the first device, requesting the second message from a second device, and storing the second message in the first device when the navigational command indicates a first direction, and communicating the last message to the user of the first device, requesting the next to last message from the second device, and storing the next to last message in the first device when the navigational command indicates a second direction opposite the first direction.

According to another embodiment of the present invention, a communication system is provided comprising a first device having a plurality of messages stored thereon, the plurality of messages being arranged in a determined order, and a second device to display the plurality message to a user of the second device in the determined order. The plurality of messages includes in the determined order a first message, a second message, a next to last message and a last message. The second device includes a processor, a memory and a display interconnected by a bus. The processor is programmed to execute a sequence of instructions that include instructions that will cause the processor to store, in the memory of the second device, the first message and the last message of the plurality of messages; display a third message to the user of the second device; and responsive to a direction of a navigational command received from the user of the second device: to display the first message to the user of the second device, request the second message from the first device, and store the second message in the memory of the second device when the navigational command indicates a first direction; and to display the last message to the user of the second device, request the next to last message from the first device, and store the next to last message in the memory of the second device when the navigational command indicates a second direction opposite the first direction.

According to another embodiment of the present invention, a method of communicating a plurality of messages to a user of a first device is provided. The method comprises acts of storing, in the first device, a first message and a second message of the plurality of messages; communicating a third message to the user of the first device; and responsive to a direction of a navigational command received from the user of the first device: communicating the first message to the user of the first device, requesting a fourth message from a second device, and storing the fourth message in the first device when the navigational command indicates a first direction; and communicating the second message to the user of the first device, requesting a fifth message from the second device and storing the fifth message in the first device when the navigational command indicates a second direction.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
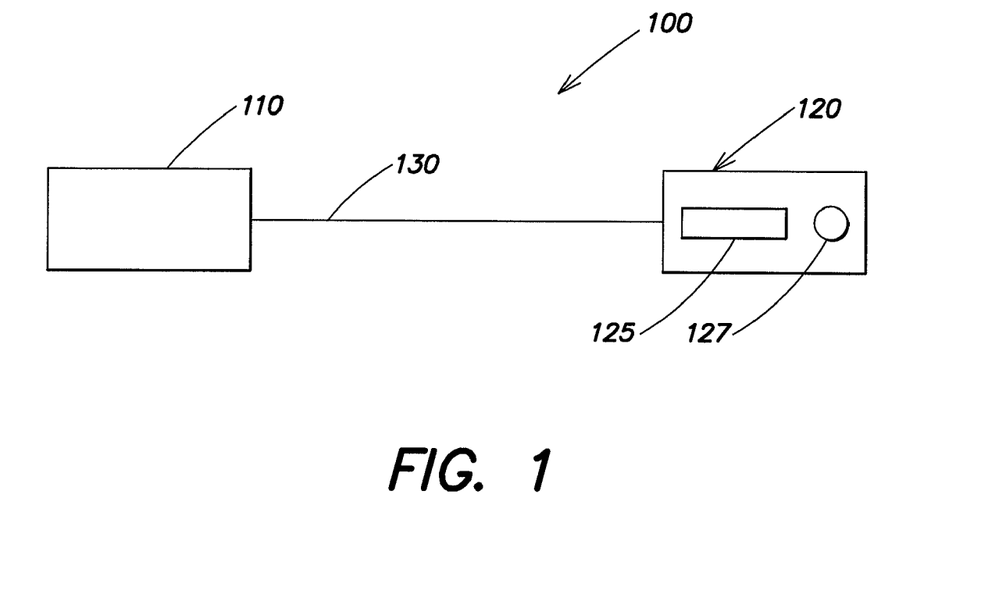
FIG. 1 illustrates a communication system in which messages known to a first system may be presented on a second system in accordance with the present invention.

FIG. 1 illustrates a communication system in which various aspects of the present invention may be practiced. In particular, communication system 100 includes one or more systems 110, 120 that communicate with one another over a communication medium 130 according to a message communication protocol. Each of the systems 110, 120 may be wholly independent and/or distinct processor based systems or devices, or alternatively, different subsystems or devices within a single system or device, such as an uninterruptible power supply, an environmental control system, etc. The communication medium 130 may be any wired or wireless communication medium known in the art, such as a point to point connection, a bus, a network, etc. over which information may be sent. In accordance with one embodiment of the present invention in which system 100 is media entertainment system, system 110 may be a processor-based media system controller and system 120 may be a processor-based uninterruptible power supply system.

As shown in FIG. 1, system 120 includes a plurality of functional elements 125, 127 through which information can be communicated to and received from a user of the system 120, and which permit the user to interact with the system 120. The plurality of functional elements includes at least one presentation device 125 by which information can be communicated to the user, and at least one input device 127 through which the user can interact with system 120 to select the information that is communicated to the user via the at least one presentation device 125. In accordance with an embodiment of the present invention, the at least one presentation device 125 can be a display device by which the information is visually presented to the user, however, it should be appreciated that other types of presentation devices may be used. For example, in alternative embodiments, the presentation device 125 may be an audio speaker, and in still other embodiments, more than one type of presentation device 125 may be provided, for example, a visual display and an audio speaker. In accordance with an embodiment of the present invention, the at least one input device 127 includes at least one push button or key by which the user can select what information is communicated to them, although other types of input devices (e.g., a trackball, a mouse or keyboard, etc) may alternatively be used.

Although not shown in FIG. 1, system 110 may also include functional elements similar to those described above with respect to system 120, by which information can be communicated to and received from a user of the system 110. It should be appreciated that system 100 is merely an illustrative embodiment of a system that may implement one or more aspects of a communication protocol according to various embodiments of the invention, and that other implementations of the system (e.g., variations of system 100 having more or less systems) are possible and are intended to fall within the scope of the invention.

In accordance with the present invention, system 110 is referred to herein as the "message providing system," and includes a memory capable of storing a plurality of messages that are to be communicated to a user of the system 120. System 120, referred to herein as the "message presenting system," communicates or presents the plurality of messages to the user via the presentation device 125 in response to certain actions taken by the user. In accordance with aspects of the present invention, the information that is communicated to the user of the message presenting system 120 need not be known to the message presenting system 120 or stored by the message presenting system 120 prior to run-time. Instead, the information that is communicated to the user of the message presenting system 120 is communicated to the message presenting system 120 by the message providing system 110. Advantageously, this allows message presenting system 120 to present an unlimited number of messages of varying content to a user, while requiring little in the way of message presenting system resources such as CPU power, usage, and memory. Indeed, in accordance with aspects of the present invention, the message presenting system 120 requires only a sufficient amount of memory to store either two or three messages, and the ability to request others. These aspects and advantages of various embodiments of the present invention are now described in more detail with respect to FIGS. 2-5 below.

Figure 2:
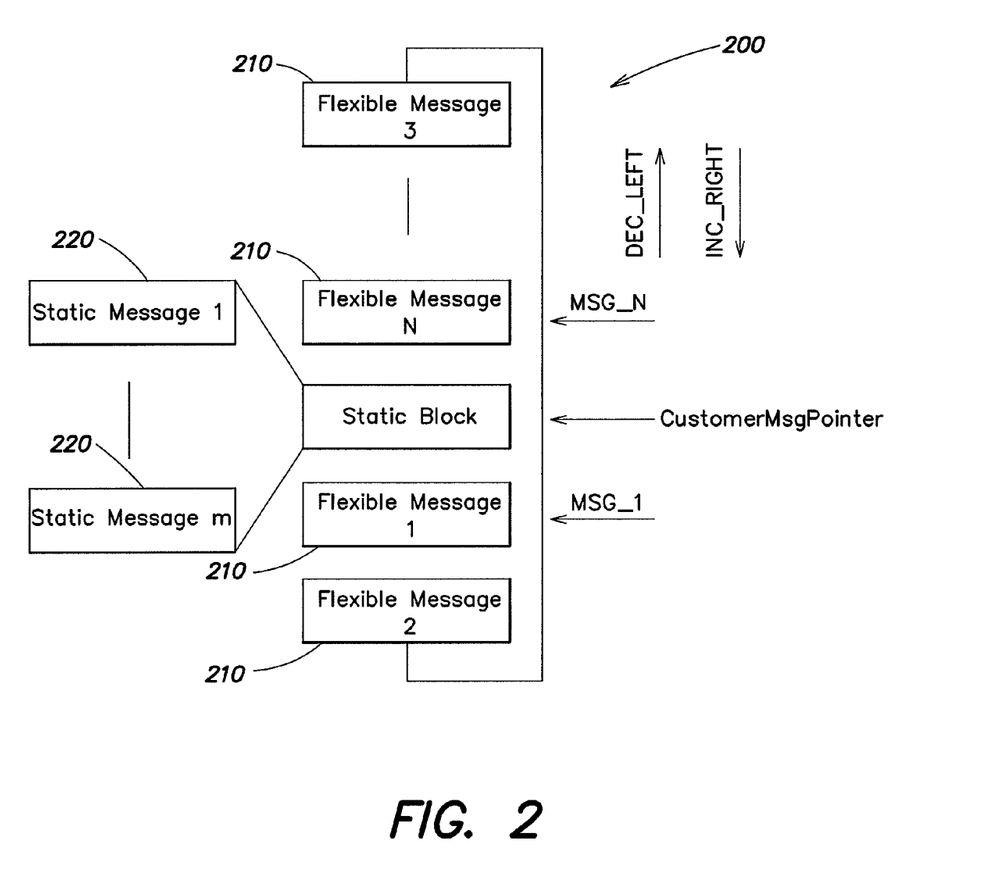
FIG. 2 functionally illustrates a messaging loop that may be performed in accordance with the present invention.

FIG. 2 functionally illustrates a message loop which may be performed in accordance with embodiments of the present invention. The message loop 200 is performed by a message presenting system, such as the message presenting system 120 of FIG. 1 based upon messages provided by a message providing system, such as the message providing system 110 of FIG. 1. The number of messages and their content may be unknown to the message presenting system prior to run time, and the messages may be presented aurally, visually, etc.

As shown in FIG. 2, the message loop 200 includes a plurality of flexible messages 210 whose content and number need not be known to the message presenting system prior to run time (hence the reason they are termed "flexible" herein). In accordance with one embodiment of the present invention, these flexible messages 210 are stored in a form of volatile memory of the message presenting system, such as dynamic RAM, and only a limited number of messages are stored at any given time. For example, in one embodiment, only two messages are stored at any given time, and in another embodiment, only three messages are stored at any given time. The size (i.e., length) of the flexible messages 210 may vary dependent on the capabilities of the message presenting system. As used herein the term "message" refers to any form of information that can be presented to a user, and may include alphanumeric data as well as graphical content, etc. In accordance with one embodiment, the messages include visually displayable character-based alphanumeric information, but it should be appreciated that other types of visually displayable information may be used. A message need not be a complete construct, such that it may require a number of messages to convey a complete word or thought or a complete riff.

As shown in FIG. 2, the message loop 200 may also include one or a plurality of static messages 220 that may or may not be known to the message presenting system prior to run time, for example, stored in a form of non-volatile memory (e.g., ROM) in the message presenting system. For example, where the message presenting system corresponds to a customized version of a standard product, these static messages 220 may reflect messages relating to the core functionality of the standard product, whereas the flexible messages 210 may reflect messages that reflect additional capabilities unique to customized version of the standard product. In accordance with one embodiment, a user may increment or step through both the static messages and the flexible messages in a loop, for example, by pressing a key or button. For example, at initialization after the power has been turned on, the message presenting system may display the first static message, static message 1. In response to a user pressing a down key or button, static message 2 is displayed. At some point, if the user keeps going in the same (e.g., downward) direction, the last static message, static message m will be displayed, followed by the first flexible message, flexible message 1, then by flexible message 2, etc. If the user continues in this direction, the last flexible message, flexible message N will be displayed, followed by static message 1, static message 2, etc, thereby executing a loop of messages.

Alternatively, and in accordance with an embodiment of the present invention, the message loop 200 may also be traversed or stepped through in the opposite direction. For example, if after initialization and the display of static message 1, the user repeatedly pressed an up key or button, flexible message N would be displayed, followed by flexible message N-1, etc. traversing the message loop 200 in the other (e.g., upward) direction. At some point, assuming the user kept traversing the message loop 200 in the same direction, flexible message 1 would be displayed, followed by static message m, static message m-1, etc. It should be appreciated that in certain embodiments, there may be only a single static message, such that the first static message and the last static message are effectively one and the same, while in other embodiments, there may be no static messages at all, with all of the messages being flexible in nature.

In accordance with an aspect of the present invention, a communication protocol is provided that enables a message presenting system to present a loop of messages to a user, wherein the loop of messages can be traversed in opposing directions, and wherein the number of messages in the loop and their order and content need not be known to the message presenting system prior to run time (i.e., such that the message loop is flexible). Although the message providing system that provides these messages to the message presenting system is aware of the number of messages and their content and order prior to its interaction with the message presenting system, little else is required of the message providing system. In accordance with one embodiment, the communication protocol includes a set of commands that allow the message presenting system to request, from the message providing system, the first and last flexible messages in the loop, and to request a next message in the loop from the message providing system when traversing the loop in either direction. Using this communication protocol, the message presenting system can present a current message, request the next message, and retain the previous message so that irrespective of the direction in which the loop is traversed, the next message to be presented to the user is found (e.g., is stored) locally in the message presenting system for nearly immediate presentation to the user.

In one embodiment wherein the message presenting system is also capable of presenting one or more static messages, the communication protocol also includes a flexible message loop terminator that alerts the message presenting system to the end of the flexible message loop, irrespective of the direction in which the end of the flexible message loop is encountered. Receipt of the flexible message loop terminator may be used by the message presenting system to return to its display of static messages, or to take other action. Such a message communication protocol is now described with respect to Tables I and II below.

Table I illustrates a set of exemplary Flexible Message Loop commands that may be sent to a message providing system by a message presenting system, as well as the actions that are to be taken by the message providing system upon receipt thereof.

TABLE I

Exemplary Flexible Message Loop Commands

| Command Name | Decimal Value | Description | Usage |
| --- | --- | --- | --- |
| DEC_LEFT ('<<' symbol) | 174 | Decrement one message | Message providing system receives this command from message presenting system and responds with message (Current Message Index − 1) immediately |
| INC_RIGHT ('>>' symbol) | 175 | Increment one message | Message providing system receives this command from message presenting system and responds with message (Current Message Index + 1) immediately |
| MSG_N | 176 | Request for last message | Message providing system receives this command from message presenting system and responds with last message (message N) immediately. Current Message Index to be set to N |
| MSG_1 | 177 | Request for first message | Message providing system receives this command from message presenting system and responds with first message (message 1) immediately. Current Message Index to be set to 1 |

In accordance with this exemplary message communication protocol, the message providing system maintains an index (Current Message Index) that identifies the most recent flexible message that it has sent to the message presenting system. The message providing system also maintains an identifier that identifies which flexible message in its flexible message loop it considers to be the first flexible message (i.e., message 1), and which flexible message it considers to be the last message (i.e., message N). It should be appreciated that which message is considered to be the first message and which is considered to be the last message need only be known to the message providing system prior to its interaction with the message presenting system. Thus, the first message and the last message, and indeed the number of messages, their content, and their order may change over time.

As shown in Table I, the Flexible Message Loop commands include a DEC_LEFT command, an INC_RIGHT command, a MSG_N command, and a MSG_1 command. The DEC_LEFT command is sent by the message presenting system to the message providing system to request the next message in the loop when traversing the loop in one direction (e.g., in an upward or backward direction). In response to receipt of the DEC_LEFT command, the message providing system responds with message (Current Message Index −1) and decrements the value of its Current Message Index by one. The INC_RIGHT command is sent by the message presenting system to the message providing system to request the next message in the loop when traversing the loop in the opposing direction (e.g., in a downward or forward direction). In response to receipt of the INC_RIGHT command, the message providing system responds with message (Current Message Index +1) and increments the value of its Current Message Index by one.

The MSG_N command is sent by the message presenting system to the message providing system to request the last message (e.g., message N) in the loop. In response to receipt of the MSG_N command, the message providing system responds with the last flexible message in the loop (i.e., message N), and sets the value of its Current Message Index to N. The MSG_1 command is sent by the message presenting system to the message providing system to request the first message (e.g., message 1) in the loop. In response to receipt of the MSG_1 command, the message providing system responds with the first message in the loop (i.e., message 1) and sets the value of its Current Message Index to 1.

As shown in Table II, and in accordance with one embodiment of the present invention in which the message presenting system is capable of displaying one or more static messages, the Flexible Message Loop commands may also include a flexible message terminator.

TABLE II

Exemplary End of Flexible Message Loop Command

| Command Name | Contents | Description | Usage |
|---|---|---|---|
| EOMSG | "APC" | Flexible message loop terminator | Message providing system sends this string to the messa presenting system. |

In accordance with one embodiment, the flexible message terminator has a value of "APC," although it should be appreciated that other values may alternatively be used. In general, the value of the flexible message terminator should be something that would be unlikely to be found in an actual flexible message. The flexible message terminator EOMSG (End of Message) is sent by the message providing system in response to either the DEC_LEFT or INC_RIGHT command and is used to indicate to the message presenting system that the end of the flexible message loop has been reached, and thus, that either message 1 or message N was the message most recently sent. Because the message presenting system is not required to be aware of the number of messages in the flexible message loop, receipt of this message informs the message presenting system that it has reached an end of the loop. In response to receipt of the flexible message loop terminator, the message presenting system may return to its display of static messages, or take other action.

In accordance with an embodiment of the present invention, which one of the static messages is displayed after receipt of the flexible message loop terminator may vary dependent on the direction in which the loop is being traversed. In one embodiment, when the user reaches the end of the flexible message loop going in a forward or downward direction (i.e., traversing the message loop from flexible message 1 to flexible message N), the first static message (i.e., static message 1) is presented, and when the user reaches the end of the flexible message loop going in the backward or upward direction (i.e., traversing the message loop from flexible message N to flexible message 1), the last static message (i.e., static message m) is presented.

In accordance with an aspect of the present invention, the communication protocol may include a minimal number of rules by which messages sent to the message presenting device are to follow. For example, in one embodiment, each flexible message includes, as the first character, an ACK character (ASCII decimal value 6) and terminates with a NULL character (ASCII decimal value 0) to enable the message presenting system to recognize the beginning and end of a message. In this embodiment, the minimum length of a message (excluding the ACK and NULL characters) is one, but few other constraints are imposed. For example, in this embodiment, no limits are placed upon the number of flexible message or their content, and the length of the flexible messages is limited only by the capabilities of the presentation device (e.g., the size of the display screen, etc.)

It should be appreciated that the set flexible message loop commands described with respect to Tables I and II are exemplary in nature and may pertain to only certain embodiments of the present invention that use both flexible and static messages. In alternative embodiments this set of message loop commands may be varied. For example, where the message presenting system includes only a single button by which a user may navigate through the message loop (i.e. either forward or backward, but not both), then only a single command for requesting the next message (e.g., DEC_LEFT or INC_RIGHT) would need to be provided/supported, since traversal of the loop can only be performed in one direction. It should be appreciated that in such an embodiment where traversal of the loop is permitted in only one direction, only two messages would be stored by the message presenting system (i.e., a current message and a next message) rather than three. Alternatively, other embodiments of a message presenting system may not include any capability for static messages, such that all of the messages would be flexible messages, and therefore no message terminator need be provided. In such an embodiment, the message presenting system would simply continue to traverse the loop of flexible messages based upon the direction of traversal selected by the user.

Figure 3:
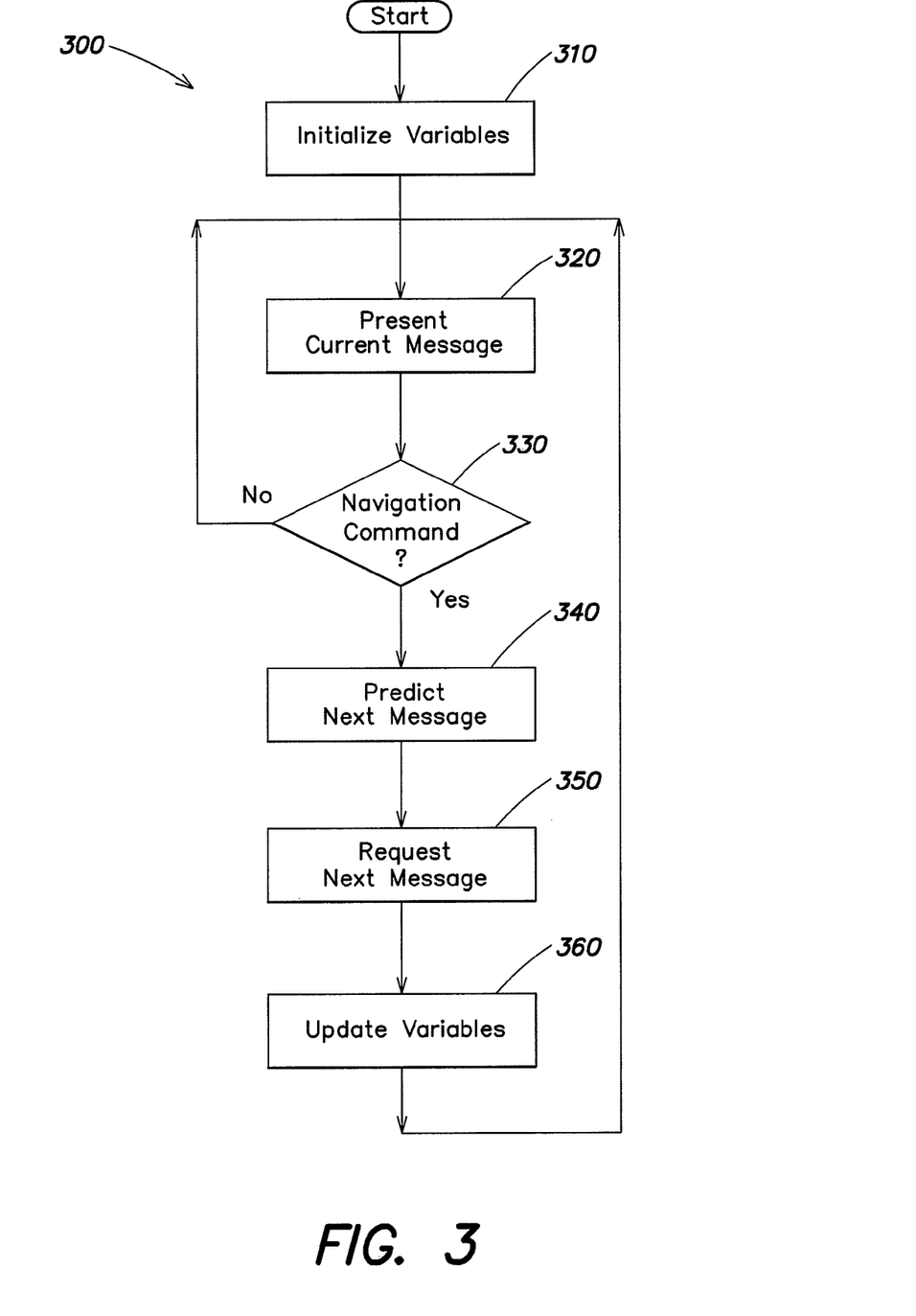
FIG. 3 illustrates a process in accordance with the present invention that may be used to communicate messages to a user.

FIG. 3 shows a process for communicating or presenting messages to a user according to one embodiment of the present invention. The process may be executed by a processor, such as a processor of a message presenting system, as described in detail with respect to FIG. 5 further below. During the message communication process illustrated in FIG. 3, a number of variables are initialized and then maintained that permit the processor to present a current message to a user and to have another message (either the next message in the loop or the previous message in the loop) ready for presentation to a user. In response to the user moving through a message loop in a forward direction, the processor displays the next message, and then requests a message providing system to provide it with the next message in the message loop in that forward direction. Where the user is permitted to move through the message loop in both directions, the processor also maintains a variable that permits the processor to keep a previous message ready for presentation to the user, in case the user decides to change direction, as well as to start out traversing the message loop in either the backward or forward direction. In response to a user moving in the backward direction, the processor presents the previous message, and then requests the message providing system to provide it with the next message in the message loop in the backward direction. This message communication process is now described in more detail with respect to the message presentation routine 300 of FIG. 3.

At block 310 a number of variables are initialized by the processor. In accordance with one embodiment of the present invention in which navigational buttons are provided for moving (i.e., traversing the message loop) in two opposing directions, variables that may be initialized in block 310 may include a variable for storing the content of a current message (CURR_MSG) in the loop, a variable for storing the content of a next message (NXT_MSG) in the loop, and a variable for storing the content of a previous message (PREV_MSG) in the loop. In accordance with one embodiment, the variable for storing the current message (CURR_MSG) may be initialized to the contents of a message that is displayed after power up of the message presenting system. This message may be a static message previously stored in a nonvolatile form of memory accessible by the processor of the message presenting system, or alternatively, may be a flexible message that may be provided by the message providing system. The variable for storing the next message (NXT_MSG) may be initialized to the content of the first flexible message, message 1, and the previous message (PREV_MSG) may be initialized to the content of the last flexible message, message N. By storing the contents of the variable next message (NXT_MSG) and the variable previous message (PREV_MSG) locally, the message presenting system can quickly access the next message in the loop for presentation to the user, irrespective of the direction in which the user proceeds through the message loop.

For example, in one embodiment, in block 310, the message presenting system may send to the message providing system the MSG_N command followed by the MSG_1 command. In response, the message providing system sends the message presenting system message N followed by message 1, with the Current Message Index of the message providing system pointing to message 1. The message presenting system may then initialize the variable CURR_MSG to the contents of the static message, the contents of PREV_MSG to message N, and the contents of NXT_MSG to message 1, so that irrespective of the direction in which the user proceeds, the message presenting system has the next message available locally for presentation to the user without delay.

In block 320, the message presentation routine 300 presents the contents of the variable CURR_MSG to the user and proceeds to block 330 where the message presentation routine awaits a navigational command from the user. If no navigational command is received from the user in block 330, then the contents of the variable CURR_MSG are simply presented (e.g., displayed) to the user. Alternatively, in response to the message presentation routine receiving a navigational command from the user, the routine proceeds to block 340 wherein the next message is predicted. In block 340, the next message is predicted based upon the direction of the navigational command received in block 330. For example, if the navigational command received from the user at block 330 corresponds to a forward movement command (e.g., the pressing of a down, right, or increment navigational button), the routine would predict the next message as being the next message in the loop in forward direction (e.g., message 2). Alternatively, if the navigational command received the user at block 330 corresponds to a backward movement command (e.g., the pressing of an up, left, or decrement navigational button), the routine would predict the next message as being the next message in the loop in the backward direction (e.g., message N-1). After predicting the next message, the message presentation routine proceeds to block 350.

In block 350, the message presentation routine 300 requests the next message in the loop from the message providing system. For example, if it were determined in block 340 that the next predicted message would be in the forward direction, then the message presenting system would send the INC_RIGHT command to the message providing system. In response, the message providing system would send the message at its Current Index +1 (e.g., message 2 in this example). In block 360, the message presentation routine updates the variables for the current message (i.e., CURR_MSG), the next message (NXT_MSG) and the previous message (i.e., PREV_MSG). Thus, for example, assuming the user were traversing the loop in the forward direction, the variable for the current message (CURR_MSG) would be updated to hold the contents previously held in the variable next message (NXT_MSG), the variable for the previous message (PREV_MSG) would be updated to hold the contents previously held in the variable current message (CURR_MSG), and the variable for the next message (NXT_MSG) would be updated to hold the contents most recently received from the message providing system (e.g., message 2 in this example). In accordance with one embodiment of the present invention, the updating of variables performed in block 360 is performed by simply adjusting pointers to memory locations in the message presenting system corresponding to the variables CURR_MSG, NXT_MSG, and PREV_MSG. After updating the variables in block 360, the message presentation routine proceeds to block 320 wherein the contents of the variable current message (CURR_MSG) are presented to the user. Blocks 320 through 360 are then repeated.

Tables III and IV below illustrate exemplary contents of the variables for the current message (i.e., CURR_MSG), the next message (NXT_MSG) and the previous message (i.e., PREV_MSG) when the message loop is traversed in forward and reverse directions, respectively in accordance with the message presentation routine of FIG. 3. In Tables III and IV, the value "Message 0" refers to a message that is displayed after power-on initialization of the message presenting system, which may, for example, be a static message. As shown in Tables III and IV, after power-on initialization, the variables for the current message (i.e., CURR_MSG), the next message (NXT_MSG) and the previous message (i.e., PREV_MSG) have the value indicated under the Current Value column. Where a navigational command is received from the user corresponding to movement in the forward direction, these variables are updated to the value indicated in the column "If Increment Received," whereas, where a navigational command is received from the user corresponding to movement in the backward direction, these variables are updated to the value indicated in the column "If Decrement Received."

TABLE III

Exemplary Variable States in Forward Loop

| State | Variable | Current Value | If Increment Received | If Decrement Received |
|---|---|---|---|---|
| Initialization | CURR_MSG | Message 0 | Message 1 | Message N |
|  | PREV_MSG | Message N | Message 0 | Message 0 |
|  | NXT_MSG | Message 1 | Message 2 | Message N − 1 |
| State 1 | CURR_MSG | Message 1 | Message 2 | Message 0 |
|  | PREV_MSG | Message 0 | Message 1 | Message 1 |
|  | NXT_MSG | Message 2 | Message 3 | Message N |
| State 2 | CURR_MSG | Message 2 | Message 3 | Message 1 |
|  | PREV_MSG | Message 1 | Message 2 | Message 2 |
|  | NXT_MSG | Message 3 | Message 4 | Message 0 |
| State N − 1 | CURR_MSG | Message N − 1 | Message N | Message N − 2 |
|  | PREV_MSG | Message N − 2 | Message N − 1 | Message N − 1 |
|  | NXT_MSG | Message N | Message 0 | Message N − 3 |

TABLE IV

Exemplary Variable States in Backward Loop

| State | Variable | Current Value | If Increment Received | If Decrement Received |
|---|---|---|---|---|
| Initialization | CURR_MSG | Message 0 | Message 1 | Message N |
|  | PREV_MSG | Message N | Message 0 | Message 0 |
|  | NXT_MSG | Message 1 | Message 2 | Message N − 1 |
| State 1 | CURR_MSG | Message 1 | Message 2 | Message 0 |
|  | PREV_MSG | Message 0 | Message 1 | Message 1 |
|  | NXT_MSG | Message 2 | Message 3 | Message N |
| State 2 | CURR_MSG | Message 2 | Message 3 | Message 1 |
|  | PREV_MSG | Message 1 | Message 2 | Message 2 |
|  | NXT_MSG | Message 3 | Message 4 | Message 0 |
| State N − 1 | CURR_MSG | Message N − 1 | Message N | Message N − 2 |
|  | PREV_MSG | Message N − 2 | Message N − 1 | Message N − 1 |
|  | NXT_MSG | Message N | Message 0 | Message N − 3 |

Of note in Tables III and IV is the fact that from one state to the next, two of the message contents stay the same, such that by simply moving pointers, the variables for the current message (i.e., CURR_MSG), the next message (NXT_MSG) and the previous message (i.e., PREV_MSG) can be efficiently updated. It should be further be appreciated that by maintaining a copy of the current message, the next predicted message and the previous message in local memory of the message presenting system, the message presenting system is able to quickly respond to any input from the user, while utilizing a minimal amount of system resources.

Figure 4:
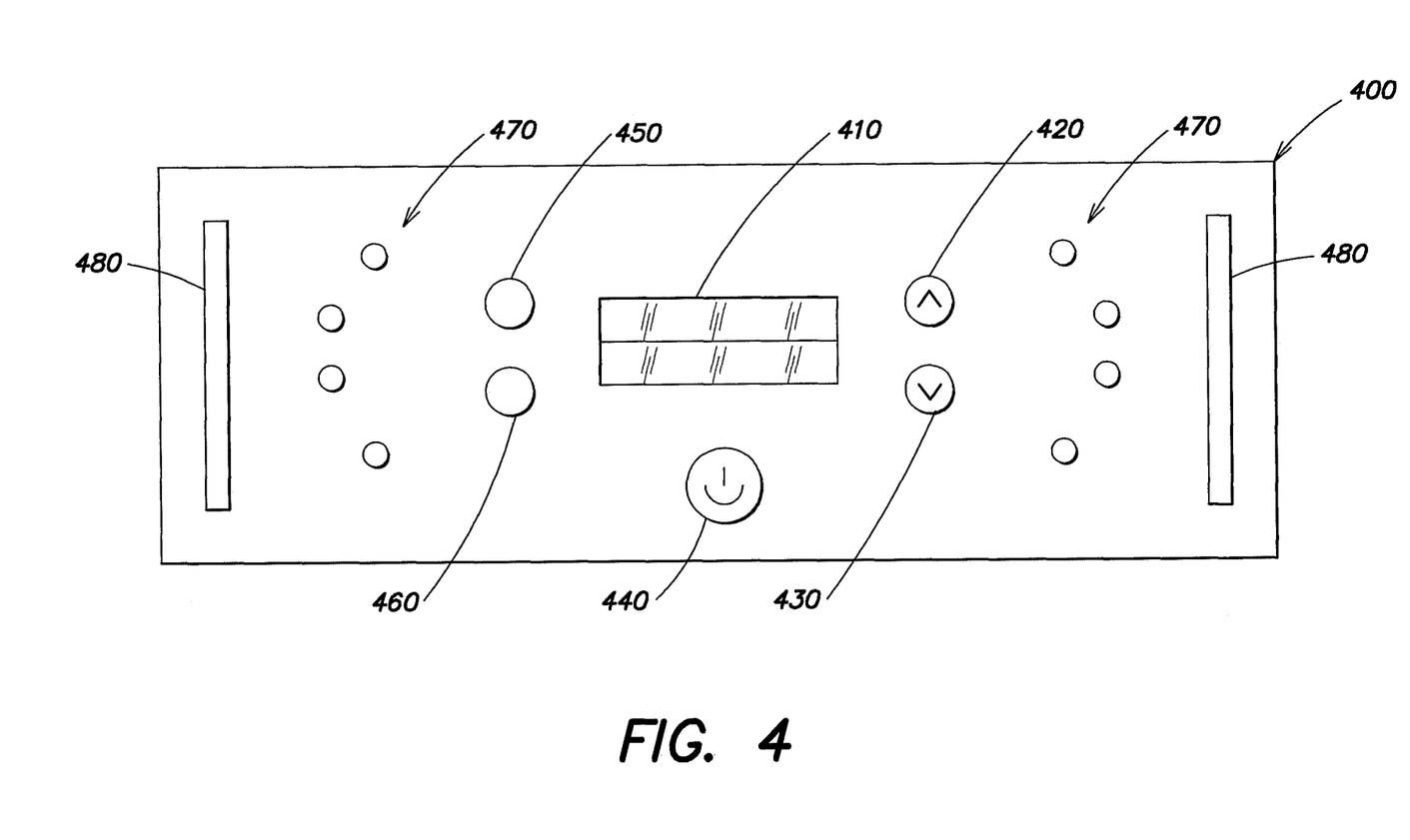
FIG. 4 is a frontal view of a Uninterruptible Power Supply that may perform aspects of the present invention.

FIG. 4 illustrates a frontal view of a rack-mountable uninterruptible power supply in accordance with one embodiment of the present invention in which various aspects of the present invention may be practiced, and which can correspond to the message presenting system 120 of FIG. 1 and perform a flexible message loop as described with respect to FIGS. 2 and 3 above. As shown in FIG. 4, the uninterruptible power supply (UPS) system 400 includes a variety of user accessible functional elements that communicate information to a user of the UPS system and which permit a user to interact with the UPS system 400. These functional elements include a display screen 410, navigational buttons 420 and 430, a power switch 440, a setup button 450, a status button 460, and a plurality of status indicators 470. In accordance with one implementation, the display screen 410 may include a two line, 20 character per line vacuum fluorescent display, although it should be appreciated that different sizes and types of displays may alternatively be used, as the present invention is not limited to any particular size, or type of display.

In accordance with aspects of the present invention, the display 410 is used to convey status and configuration information to the user, and through the use of buttons 420, 430, 450 and 460, to sequence through various configuration settings and operational statuses and to set, change, or adjust the various configuration settings. For example, the navigational buttons 420 and 430 allow a user to interact with the UPS system, for example to scroll upwardly and downwardly through a series of messages or other information reflecting the operational status or configuration of the UPS system, and in certain modes, to adjust settings up or down, or turn settings on or off. Preferably, two navigational buttons are provided, reflecting two opposing directions (e.g., up and down, in or out, left or right, increment or decrement) to permit a user to scroll through information in either direction. However, as discussed further in detail below, the present invention is not limited to the use of two different and opposing navigational buttons, as only one may be provided. In accordance with aspects of the present invention, navigational buttons 420 and 430 permit a virtually unlimited number of messages of varying content to be displayed to the user via the display 410. Further, what messages are displayed on the display 410 of the UPS system 400, the number of messages, and the order in which the messages are displayed need not be known to the UPS system 400 prior to run time.

The power switch 440 is disposed on the front panel of the UPS system 400 to allow easy access by a user, even when the UPS system is rack mounted such that only the front of the UPS system is accessible. The setup button 450 enables the user to sequence through various configuration settings and operations, and the status button 460 enables the user to sequence through various electrical and environmental measurements, operational status messages, battery condition messages, and other system information. The plurality of status indicators 470 are used to display certain information that may be of a higher priority to the user, such as, for example, whether power is being provided from battery, whether the UPS system is on line, whether the remaining battery life of the UPS system has fallen below a certain amount, whether the AC power provided to the UPS system is within an acceptable operating range, whether noise filtering is active, etc.

In accordance with aspects of the present invention, UPS system 400 is capable of displaying a plurality of flexible messages on the display 410, wherein the number of flexible message, their order, and their content is not known to the UPS system prior to run time, that is, the flexible messages are not stored in a form of permanent memory within the UPS system. In one embodiment, the flexible messages are stored in dynamic memory, such as Dynamic RAM, and only three memory locations corresponding to a current display screen, a next display screen, and a previous display screen are dynamically stored by the UPS system at any given time. During the display of the flexible messages, the UPS system 400 performs a message presentation routine such as described above with respect to FIG. 3. For example, in response to a user pressing the down navigational button 430, the UPS system 400 would display the next message in the loop in the downward or forward direction and send the INC_RIGHT command to the message providing system, and in response to the user pressing the up navigational button 420, the UPS system 400 would display the previous message in the loop in the upward or backward direction and send the DEC_LEFT command to the message providing system.

Various embodiments according to the invention may be implemented on one or more processor-based systems, such as a processor-based UPS system. These processor-based systems may, for example, utilize general-purpose processors such as those based on an Intel PENTIUM-type processor, a Motorola PowerPC processor, a Sun UltraSPARC processor, Hewlett-Packard PA-RISC processors, or any other type of processor. Alternatively, these processor-based systems may be based on a dedicated or application specific processor, such as an eight or 16 bit ST72F321 (8-bit) or STM32F102 (16-bit) processor available from STMicroelectronics. Software executing in such processor-based systems may act as a controller to control the operation of the system within which it is used, such as, for example, a UPS system. That software may include specialized software code that implements a messaging system and protocol in accordance with the present invention. An exemplary processor-based system in which embodiments of the present invention may be practiced and which may form a part of the UPS system of FIG. 4 is now described with respect to FIG. 5.

Figure 5:
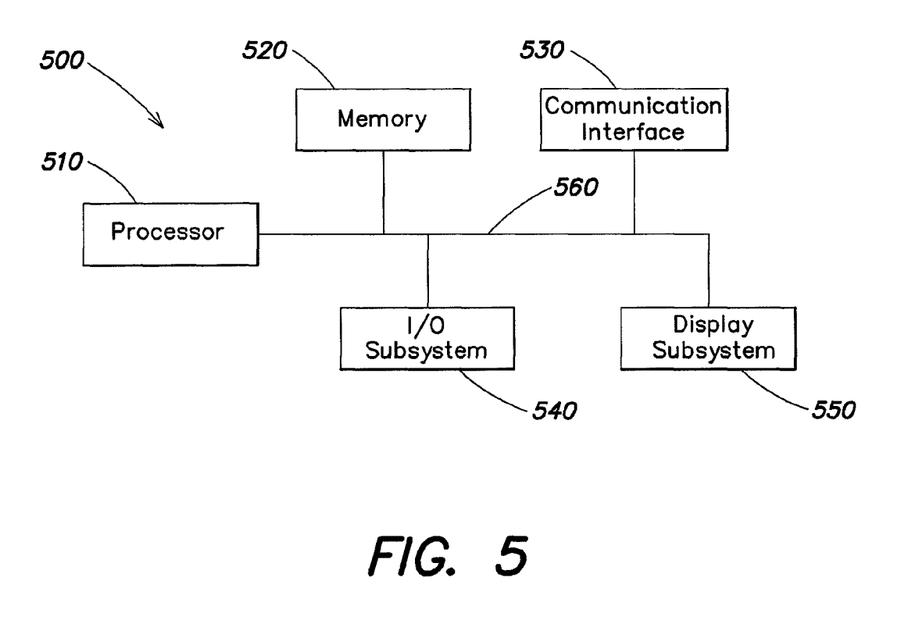
FIG. 5 is a functional block diagram of a processor-based system in which various aspects of the present may be performed.

Processor-based system 500 generally includes a processor 510, a memory 520, a communication interface 530, an I/O subsystem 540, and a display subsystem 550 interconnected by a bus 560. As noted previously, the processor 510 may be a general-purpose processor, or any other type of processor known in the art, as the present invention is not limited to any particular type of processor. In one embodiment, the processor is an eight-bit ST72F321 processor from STMicroelectronics. The memory 520 may be used for storing programs and data during operation of the processor-based system 500. Generally, the memory 520 will include a combination of a relatively high performance, volatile, random access memory such as a dynamic random access memory (DRAM) as well as other, more permanent forms of memory, such as ROM, PROM, EEPROM etc. However, it should be appreciated that the memory 520 may include any device for storing data, such as a disk drive or other types of non-volatile storage devices.

Communication interface 530 may be used by the processor-based system 500 to communicate with other devices, such as the message providing system 110 of FIG. 1, over any communication medium, wired or wireless. For example, communication interface may be a wireless or wired ETHERNET communication interface, a Universal Serial Bus (USB) interface, an RS-232, RS-422, or RS-485 serial interface, an IEE-1284 parallel interface, or any other type of communication interface capable of transmitting and receiving data.

I/O subsystem 540 may be used by the processor-based system 500 to receive input from a user and/or to provide output to the user. This input may be received from various input devices, such as the navigational buttons 420, 430 in FIG. 4 and provided to various output devices, such as indicators 470 in FIG. 4. It should be appreciated that other types of input and output devices may be used, for example, a trackball or a mouse, a keyboard, etc., as the present invention is not limited to a particular input or output device.

The display subsystem 550 is used by the processor-based system to communicate messages to a user, such as on the display 410 depicted in FIG. 4. In operation, the processor 410 provides the display subsystem with a screen of information to display to the user. In accordance with one embodiment, the screen of information may include two lines of information, each up to twenty characters in length. It should be appreciated that other types of presentation devices may alternatively be used, and that other forms of display (e.g., a bitmap display, etc.) could alternatively be used.

The bus 560 may include any communication coupling between system elements including specialized or standard computing bus technologies such as IDE, SCSI, PCI and InfiniBand. Thus, the bus 560 enables communications (for example, data and instructions) to be exchanged between system components of the processor-based system 400.

During operation, the processor 510 may perform, among other tasks, a message presentation routine such as that described above with respect to FIG. 3. For example, the processor 510 may store the contents of a current message, a next message, and a previous message in memory 520, and send the contents of the current message to the display subsystem 550 for display to a user. In response to the user pressing a navigational button, the I/O system 540 may notify the processor 510 of this event. Responsive to this notification, the processor 510 may send the contents of the next message to the display system 550 for display to the user, and send a command to the communication interface 530 to request a next message in the loop from a message providing system.

Although the processor-based system is shown by way of example as one type of processor-based system upon which various aspects and functions in accordance with the present invention may be practiced, aspects of the invention are not limited to being implemented on the system as shown in FIG. 5. Various aspects and functions in accord with the present invention may be practiced on one or more processor-based systems having a different architectures or components than that shown in FIG. 5.

Exemplary Flexible Messaging Algorithm

The following is an exemplary algorithm written in the C programming language for performing flexible messaging in accordance with the present invention. The algorithm is specifically adapted for use with a two line display screen, where each line is 20 characters in length. In this algorithm, two messages are displayed at a time, and storage arrays are provided for storing a current display screen, a previous display screen, and a next display screen, each of which may hold two messages. This algorithm uses a minimal amount of memory, and may be efficiently executed on any processor. For example, on an eight-bit ST72F321 processor, this algorithm requires only 134 bytes of memory to store three 42 byte display screens of information (current, previous, and next), maintain the appropriate variables and pointers, and permit movement in both directions. This exemplary algorithm also includes functionality to operate in only one direction (e.g., down or forward), in which case only two display screens of information are stored. The following explanation provides an overview of the various functions defined in the exemplary algorithm below:

Function: FlxScrnCircle

This function manipulates pointers to point to the correct areas of physical memory when the user is moving in a forward or downward direction. More specifically, this function manipulates the pointers so that the pointer for the Previous Screen (pPrevScrn) points to the memory location previously holding the current screen information, the pointer for Current Screen (pCurrScrn) points to the memory location previously holding the next screen information, and the pointer to the Next Screen (pCurrLine) points to the first message line of the memory area that was previously holding the previous screen information.

Function: FlxScrnCounterCircle

This function behaves exactly opposite to FlxScrnCircle and manipulates the pointers to point to the correct areas of physical memory when the user is moving in a backward or upward direction. More specifically, this function manipulates the pointers so that the pointer for the Previous Screen (pPrevScm) points to the memory location previously holding the current screen information, the pointer for Current Screen (pCurrScrn) points to the memory location previously holding the next screen information, and the pointer to the Next Screen (pCurrLine) points to the second message line of the memory area that was previously holding the previous screen information.

Function: Flx_IsItEndLoop

This function manipulates the pointer that points to the memory location for storing the Next Screen (pCurrLine) so that it points to the correct line (message) dependent upon the direction of movement (forward or backward). Therefore, if moving in the forward direction, the pointer will point to the first line (message) sText, while if moving in the backward direction, the pointer will point to the second line (message) sText2. After manipulating the pointer, this function checks to see if the flexible message terminator has been received. Upon receipt of the flexible message terminator, the function FlxEndLoopProcess is called to set the pointer to the null state.

Function: FlexStartFirstLine

This function obtains the first flexible message, flexible message 1 from the message providing system in the event that the routine is to start from the first flexible message. That is, in case the routine will begin by exiting out of the static block of messages in the forward direction.

Function: FlexStartFromLastLine

This function obtains the last flexible message, flexible message N from the message providing system in the event that the routine is to start from the last flexible message N. That is, in case the routine will begin by exiting out of the static block of messages in the backward direction.

Function: DefaultStatusPrevFlexible

This function enables prior legacy code to be used for static message handling when the user moves back into static messaging. The function is called by the function InitialTheLastFlexibleMessage and initializes variables used for flexible messaging only once after the system is powered on. Thus, existing legacy code may be used to handle static messages, while the flexible messaging algorithm is used for the flexible messages.

Function: InitialTheLastFlexibleMessage

The purpose of this function is to ensure a smooth system startup. After the system is powered on, this function waits for a preset period of time and then initializes variables and then calls the function DefaultStatusPrevFlexible to determine whether flexible messaging is initiated from the first flexible message or the last flexible message.

Function: FlexibleInnerLoopNormal

This function is called by the function FlexibleStringInnerLoop and handles the normal inner loop case, that is, where the user is in the middle portion of loop of flexible messages, such that neither moving forward or backward takes the user out of the flexible message loop and into static messages. This function sends a command (INC_RIGHT_CMD or DEC_LEFT_CMD) dependent upon the direction of movement to request the next message from the message providing system and is called by the function FlexibleStringInnerLoop.

Function: FlexibleStringInnerLoop

This function is the main code segment that calls all the others, as needed. The function is called by another section of code called IncFxnPtr or DecFxnPtr based upon whether the user pressed the up button or the down button.

```
//===============================================================
//===============================================================
#define FLEXIBLE_BUFFERS           1    // Enable Flexible screen feature
                                        // Set to 0 to disable Flexible screen
                                        //feature
#if FLEXIBLE_BUFFERS
#define FULL_LINE_SIZE_BUFF        21   // determined by physical size of
                                        // display plus 1
#define BOTH_UPDOWN_DIRECTION      1    // enable movement in both
                                        //directions; set to 0 for down/right
                                        // movement only
// The number of sText_n buffer in the structure should be determined by
// the message lines per screen. FULL_LINE_SIZE_BUFF should be defined
// as the maximum possible single message length plus 1.
//
// The following structure is an exemplary definition of the structure FLEXBUFF
// for a two line per screen display.
typedef struct FLEX_BUFF {
  char sText[FULL_LINE_SIZE_BUFF];    //holds first message line of screen
  char sText2[FULL_LINE_SIZE_BUFF];   //holds second message line of screen
} FLEXBUFF;
// To define the structure of FLEXSCN
typedef struct FLEXIBLE_SCREEN {
  char   *pCurrLine; // points to the buffer to fill next incoming message
  FLEXBUFF *pCurrScrn; // pointer to the current display screen
  FLEXBUFF *pPrevScrn; // pointer to the previous display screen
  FLEXBUFF sLine[3];   // Three is required for handling the feature
  char   bScreenIndex; // screen control parameter
  //has a value of either 0, 1, or 2 and is an index into the array sLine[ ]
  // message and screen status variables for message control
  UBYTE bLoopCnt;
  UBYTE bStatus;
  // Message requests record tracking
  UBYTE bIncMsgReq; // increment message requested count
```

-continued

```
#if BOTH_UPDOWN_DIRECTION
  UBYTE bDecMsgReq; // decrement message requested count
#endif
} FLEXSCN;
// ************ definition for bStatus ***************
#define fBackEndLoop    0x80 // Bit7 - 1: if set, moving backward is end of loop
#define fAcknowledged   0x40 // Bit6 - 1: ACK char received, 0: not yet received
#define fNotInitialState 0x20 // BIT5 - 1: Not in initial state, 0: in initial state
#define fEndLoop        0x10 // BIT4 - 1: End of Flexible Inner loop (EOMSG)
#define fScrnReady      0x08 // BIT3 - 1: Ready for next screen messages
#define f1stLine        0x04 // BIT2 - 1: 1st line, 0: 2nd line; See Note below
#define fDefaultScrn    0x02 // BIT1 - 1: Negtive/Decrement/backward direction
#define fIncfunc        0x01 // BIT0 - 1: IncFxn, 0: DecFxn;
// Note: if a byte was used instead of a single bit, can accommodate 256 lines!
FLEXSCN    FlxScn;        // Allocate physical memory here
//=============================================================
//
// Function:    FlxScrnCircle ( )
//
// Description: Screen increment/Clockwise movement
//
// Input:
//      char bScrnIndex - Screen index number ( 0, 1, 2 )
//
//=============================================================
//
void FlxScrnCircle ( char bScrnIndex )
{
 FlxScn.pCurrScrn = &(FlxScn.sLine[ bScrnIndex ]);
 FlxScn.pPrevScrn = FlxScn.pCurrScrn++;
 if ( bScrnIndex == 2 )    // only if this condition satisfied, implement next statement
   FlxScn.pCurrScrn = &(FlxScn.sLine[0]);
 // Points to the buffer to receive new message
 FlxScn.pCurrLine = FlxScn.pCurrScrn->sText;
}
//=============================================================
//
// Function:    FlxScrnCounterCircle ( )
//
// Description: Screen decrement/Counter clockwise movement
//
// Input:
//      char bScrnIndex - Screen index number ( 0, 1, 2 )
//
//=============================================================
//
void FlxScrnCounterCircle ( char bScrnIndex )
{
 FlxScn.pCurrScrn = &( FlxScn.sLine[ (2 – bScrnIndex) ] );
 FlxScn.pPrevScrn = FlxScn.pCurrScrn--;
 if ( bScrnIndex >= 2 )    // only if this condition satisfied, implement next statement
   FlxScn.pCurrScrn = &(FlxScn.sLine[2]);
 // Points to the buffer to receive new message
 FlxScn.pCurrLine = FlxScn.pCurrScrn->sText2;
}
//=============================================================
//
// Function:    Flx_IsItEndLoop ( )
//
// Description: Verify if it is the end of flexible message loop
//
// Input:
//      char bScrnIndex - Screen index number ( 0, 1, 2 )
//      UBYTE fIncFxn - if 0, move up_left, else move down_right
//
//=============================================================
//
void Flx_IsItEndLoop ( char bScrnIndex, UBYTE fIncFxn )
{
 FLEXBUFF *pScrn; // points to proper screen
 char    *pStr;
 if ( !fIncFxn )             // if it is moving up_left
 {
  pScrn = &( FlxScn.sLine[ (2 – bScrnIndex) ] );
  pStr = pScrn->sText2;
 }
 else                        // if it is moving down_right
 {
  pScrn = &( FlxScn.sLine[ bScrnIndex ] );
```

-continued

```
  pStr = pScrn->sText;
 }
 if ( !*pStr || !strcmp( pStr, "APC" ) )
   FlxEndLoopProcess ( );
}
//=====================================================
//
// Function:    FlxEndLoopProcess ( )
//
// Description: End of Flexible Message Loop process
//
// Input: None
//
//=====================================================
//
void FlxEndLoopProcess ( void )
{
 if ( ValTheBit(FlxScn.bStatus, f1stLine) )
  {
   if ( FlxScn.pCurrLine == FlxScn.pCurrScrn->sText )
     FlxScn.pCurrScrn->sText2[0] = 0;
   else
     FlxScn.pCurrScrn->sText[0] = 0;
 }
#if NO_TERMINATER_DISPLAY
 *FlxScn.pCurrLine = 0;
#endif
 // termination string received...
 SetTheBit( FlxScn.bStatus, (fEndLoop | fScrnReady) );
}
//=====================================================
//
// Function:    FlexStartFirstLine ( )
//
// Description: Set to request the first flexible message line
//
// Input: none.
//
//=====================================================
//
void FlexStartFirstLine ( void )
{
 ClrTheBit( FlxScn.bStatus, fScrnReady );
 FlxScrnCircle ( FlxScn.bScreenIndex );
#if BOTH_UPDOWN_DIRECTION
 SetTheBit(FlxScn.bStatus, (fIncfunc | f1stLine | fBackEndLoop) );
#else
 SetTheBit(FlxScn.bStatus, f1stLine );
#endif
 SendInsertCmd ( INC_MSG_1_CMD );
}
//=====================================================
//
// Function:    FlexStartFromLastLine ( )
//
// Description: Set to request the last flexible message line
//
// Input: none.
//
//=====================================================
//
void FlexStartFromLastLine ( void )
{
 FlxScrnCounterCircle ( FlxScn.bScreenIndex );
#if BOTH_UPDOWN_DIRECTION
 SetTheBit( FlxScn.bStatus, (f1stLine | fBackEndLoop) );
 ClrTheBit(FlxScn.bStatus, fIncfunc);
#else
 SetTheBit( FlxScn.bStatus, f1stLine );
#endif
 SendInsertCmd ( DEC_MSG_N_CMD );
}
//=====================================================
//
// Function:    DefaultStatusPrevFlexible ( )
//
// Description: Set to default status for the last flexible message line
```

```
//
// Input: none.
//
//=============================================================
//
void DefaultStatusPrevFlexible ( void )
{
  if ( !ValTheBit( FlxScn.bStatus, fDefaultScrn ) )
  {
    if ( !ValTheBit( bbmCommFlags, fUI_uLinkMode ) )    // if satisfy legacy code condition,
                                                        //do additional work
  {
#if BOTH_UPDOWN_DIRECTION
      if ( EE_default_screen < 4 )
        FlexStartFromLastLine ( );
      else
#endif
        FlexStartFirstLine ( );
    }
    SetTheBit( FlxScn.bStatus, fDefaultScrn );
  }
}
//=============================================================
//
// Function:    InitialTheLastFlexibleMessage ( )
//
// Description: Initialization for the last flexible message
//
// Input: none.
//
//=============================================================
//
void InitialTheLastFlexibleMessage ( void )
{
  if ( !ValTheBit( FlxScn.bStatus, fNotInitialState ) )
  {
    if ( FlxScn.bLoopCnt++ >= 126 )      // timing control statement to delay and minimize
                                         // following process
    {
      SetTheBit( FlxScn.bStatus, fNotInitialState );
      ClrTheBit( FlxScn.bStatus, fDefaultScrn );
      DefaultStatusPrevFlexible ( );
    }
  }
}
//=============================================================
//
// Function:    FlexibleInnerLoopNormal ( )
//
// Description: Handling normal inner loop case
//
// Input:
//      UBYTE max_funcs - Number of items in the function menu
//      UBYTE fIncFxn - if 1, called by IncFxnPtr( )
//                        else, called by DecFxnPtr( )
//      char bScrnIndex - Screen index number ( 0, 1, 2 )
//
//=============================================================
//
void FlexibleInnerLoopNormal ( UBYTE max_funcs,
                               UBYTE fIncFxn,
                               char bScrnIndex )
{
  SetTheBit( FlxScn.bStatus, f1stLine );   // start to fill the 1st line of screen
#if BOTH_UPDOWN_DIRECTION
  if ( fIncFxn )
  {
    SetTheBit( FlxScn.bStatus, fIncfunc );
    FlxScrnCircle ( bScrnIndex );
    bFuncIndex = (max_funcs−4) + (bScrnIndex << 1);
    SendInsertCmd ( INC_RIGHT_CMD );
  }
  else
  {
    ClrTheBit( FlxScn.bStatus, fIncfunc );
    FlxScrnCounterCircle ( bScrnIndex );
    bFuncIndex = max_funcs − (bScrnIndex << 1);
    SendInsertCmd ( DEC_LEFT_CMD );
  }
```

-continued

```
   // Control immediately returns to static messages case
   if ( ValTheBit( FlxScn.bStatus, fDefaultScrn ) )
     ClrTheBit( FlxScn.bStatus, fDefaultScrn );
#else
   FlxScrnCircle ( bScrnIndex );
   bFuncIndex = (max_funcs−4) + (bScrnIndex << 1);
   SendInsertCmd ( INC_RIGHT_CMD );
#endif       // block of BOTH_UPDOWN_DIRECTION
}
//================================================================
//
// Function:   FlexibleStringInnerLoop ( )
//
// Description: When Increment or Decrement function key was pressed,
//              handle flexible messages in a loop until signaled to exit
//
// Input:
//     UBYTE max_funcs - Number of items in the function menu
//     UBYTE fIncFxn - if 1, called by IncFxnPtr( )
//                           else, called by DecFxnPtr( )
//
//================================================================
void FlexibleStringInnerLoop ( UBYTE max_funcs, UBYTE fIncFxn )
{
  char bScrnIndex;     // use local variable to be more flexible
  // Clear the flag for updating new screen messages
  ClrTheBit( FlxScn.bStatus, fScrnReady );
  bScrnIndex = FlxScn.bScreenIndex + 1;
  if ( bScrnIndex > 2 )
    bScrnIndex = 0;
#if BOTH_UPDOWN_DIRECTION
  // Handle direction changed case when inside the inner loop
  if ( fIncFxn != ValTheBit( FlxScn.bStatus, fIncfunc ) )
  {
    if ( bScrnIndex < 2 )
      bScrnIndex ^= 0x01;      // Here's another trick for fast switch
    // in here, should check if key press direction changed,
    // and current screen contains teminator
    if ( ValTheBit( FlxScn.bStatus, fBackEndLoop ) )
    {
      SetTheBit( FlxScn.bStatus, fEndLoop );
    }
    else
    {
      // since direction changed, previous EndLoop no longer valid
      if ( ValTheBit( FlxScn.bStatus, fEndLoop ) )
      {
        ClrTheBit( FlxScn.bStatus, fEndLoop );
      }
      if ( ( ( !fIncFxn && (FlxScn.bIncMsgReq == 5) )
          || ( fIncFxn && (FlxScn.bDecMsgReq == 5) ) ) )
        Flx_IsItEndLoop ( bScrnIndex, fIncFxn );
    }
  }
#endif       // block of BOTH_UPDOWN_DIRECTION
  FlxScn.bScreenIndex = bScrnIndex;    // update to current screen
  if ( !ValTheBit( FlxScn.bStatus, fEndLoop ) )
  {
    FlexibleInnerLoopNormal ( max_funcs, fIncFxn, bScrnIndex );
  }
  else    // if ( ValTheBit( FlxScn.bStatus, fEndLoop ) )
  {
    // When moving from flexible message loop toward static messages,
    // it's necessary to prepare the starting flexible messages
    // so that when user presses a key to move back from static
    // menu to flexible menu, the screen is ready.
    ClrTheBit( FlxScn.bStatus, fEndLoop );
#if BOTH_UPDOWN_DIRECTION
    if ( !fIncFxn )
    {
        bFuncIndex = max_funcs − 6;
        ClrTheBit( FlxScn.bStatus, fIncfunc );
    }
    else
    {
        bFuncIndex = 0;
        SetTheBit( FlxScn.bStatus, fIncfunc );
    }
else
```

```
    bFuncIndex = 0;
#endif          // block of BOTH_UPDOWN_DIRECTION
    if ( FlxScn.bIncMsgReq & 1 )
      SetTheBit( FlxScn.bStatus, fScrnReady );
  }
}
#endif          // block of FLEXIBLE_BUFFERS
```

The above algorithm requests the next flexible message (e.g., message i) from a message providing system and places it in a memory location for the next display screen and pointed to by the pointer *pCurrLine. Because in this illustrative embodiment, each display screen can include two messages, the next message (e.g., message i+1 or i−1) in the current direction of movement is also requested. In one embodiment, this next message is requested by a function called Process_FlexibleStringUpdate that includes the following code:

```
#if BOTH_UPDOWN_DIRECTION
    if ( ValTheBit(FlxScn.bStatus, fIncfunc) )
    {
      FlxScn.pCurrLine = FlxScn.pCurrScrn->sText2;
      SendInsertCmd ( INC_RIGHT_CMD );     // request update flexible string from message
                                           //providing system
    }
    else
    {
      FlxScn.pCurrLine = FlxScn.pCurrScrn->sText;
      SendInsertCmd ( DEC_LEFT_CMD );      // request update flexible string from message
                                           //providing system
    }
else
      FlxScn.pCurrLine = FlxScn.pCurrScrn->sText2;
      SendInsertCmd ( INC_RIGHT_CMD );     // request update flexible string from message
                                           // providing system
#endif
In this exemplary embodiment, the function Process_FlexibleStringUpdate is called when
either the DEC_LEFT_CMD or INC_RIGHT_CMD is provided to the communication
interface for transmission to the message providing system by the following code segment:
#if FLEXIBLE_BUFFERS
    case DEC_LEFT_CMD:
    case INC_RIGHT_CMD:
    case DEC_MSG_N_CMD:
    case INC_MSG_1_CMD:
      Process_FlexibleStringUpdate ( bRxChar );
      break;
#endif
```

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the scope of the invention. Accordingly, the foregoing description is by way of example only.

What is claimed is:

1. A method of communicating a plurality of messages that are arranged in a determined order to a user of a first device, the plurality of messages including in the determined order a first message, a second message, a next to last message and a last message, the method comprising acts of:

storing, in the first device, the first message and the last message of the plurality of messages;
presenting a third message to the user of the first device;
receiving a navigational command input by the user of the first device;
presenting, responsive to the navigational command indicating a first direction, the first message to the user of the first device, requesting the second message from a second device, and storing the second message in the first device; and
presenting, responsive to the navigational command indicating a second direction opposite to the first direction, the last message to the user of the first device, requesting the next to last message from the second device, and storing the next to last message in the first device.

2. The method of claim 1, wherein each of the plurality of messages is previously identified to the second device but not to the first device until each of the plurality of messages is stored in the first device.

3. The method of claim 2, further comprising an act of:
requesting the first message and the last message from the second device.

4. The method of claim 3, wherein the act of storing the second message includes an act of storing the second message in a memory location of the first device that previously stored the last message.

5. The method of claim 4, wherein the act of storing the next to last message includes an act of storing the next to last message in a memory location of the first device that previously stored the first message.

6. The method of claim 1, wherein the act of storing the second message includes an act of storing the second message in a memory location of the first device that previously stored the last message.

7. The method of claim 1, wherein the first device is physically distinct from the second device.

8. The method of claim 1, further comprising an act of storing no more than three messages of the plurality of messages in a memory of the first device at any one moment in time.

9. The method of claim 1, further comprising an act of allocating, in the first device, no more than a predetermined amount of memory to store each of the plurality of messages, the predetermined amount of memory being sufficient to store no more than three of the plurality of messages.

10. A communication system comprising:
a first device having a plurality of messages stored thereon, the plurality of messages having a determined order and including in the determined order a first message, a second message, a next to last message and a last message;
a second device to communicate the plurality message to a user of the second device in the determined order, the second device including a processor, a memory and a presentation device interconnected by a bus, the processor being programmed to execute a sequence of instructions that include instructions that will cause the processor to:
store, in the memory of the second device, the first message and the last message of the plurality of messages;
present on the presentation device a third message to the user of the second device; and
responsive to a navigational command input by the user of the second device
present on the presentation device the first message to the user of the second device, request the second message from the first device, and store the second message in the memory of the second device in response to the navigational command indicating a first direction; and
present on the presentation device the last message to the user of the second device, request the next to last message from the first device, and store the next to last message in the memory of the second device in response to the navigational command indicating a second direction opposite the first direction.

11. The communication system of claim 10, wherein none of the plurality of messages is identified to the second device until stored in the memory of the second device.

12. The communication system of claim 11, wherein the sequence of instructions further include instructions that will cause the processor to request the first message and the last message from the first device.

13. The communication system of claim 12, wherein the sequence of instructions further include instructions that will cause the processor to store the second message in a first portion of the memory of the second device that previously stored the last message.

14. The communication system of claim 13, wherein the sequence of instructions further include instructions that will cause the processor to store the next to last message in a second portion of the memory of the second device that previously stored the first message.

15. The communication system of claim 10, wherein the sequence of instructions further include instructions that will cause the processor to store the second message in a portion of the memory of the second device that previously stored the last message.

16. The communication system of claim 10, wherein the first device is physically distinct from the second device.

17. The communication system of claim 10, wherein the memory of the second device stores no more than three messages of the plurality of messages at any one moment in time.

18. The communication system of claim 10, wherein the sequence of instructions further include instructions that will cause the processor to allocate, in the second device, no more than a predetermined amount of the memory of the second device to store each of the plurality of messages, the predetermined amount of the memory of the second device being sufficient to store no more than three of the plurality of messages.

19. A method of communicating a plurality of messages to a user of a first device comprising acts of:
storing, in the first device, a first message and a second message of the plurality of messages;
presenting a third message to the user of the first device;
receiving a navigational command input by the user of the first device;
presenting, responsive to the navigational commanding indicating a first direction, the first message to the user of the first device, requesting a fourth message from a second device, and storing the fourth message in the first device; and
presenting, responsive to the navigational commanding indicating a second direction opposite the first direction, the second message to the user of the first device, requesting a fifth message from the second device and storing the fifth message in the first device.

20. The method of claim 19, wherein each of the plurality of messages is previously identified to the second device but not to the first device until each of the plurality of messages is stored in the first device.

21. The method of claim 20, further comprising an act of:
requesting the first message and the second message from the second device.

22. The method of claim 21, wherein the act of storing the fourth message includes an act of storing the fourth message in a memory location that previously stored the second message.

23. The method of claim 22, wherein the act of storing the fifth message includes an act of storing the fifth message in a memory location that previously stored the first message.

24. The method of claim 23, further comprising an act of storing no more than three messages of the plurality of messages in a memory of the first device at any one moment in time.

25. The method of claim 24, further comprising an act of allocating, in the first device, no more than a predetermined amount of memory to store each of the plurality of messages, the predetermined amount of memory being sufficient to store no more than three of the plurality of messages.

* * * * *